Inventor
Warren A. Melendy

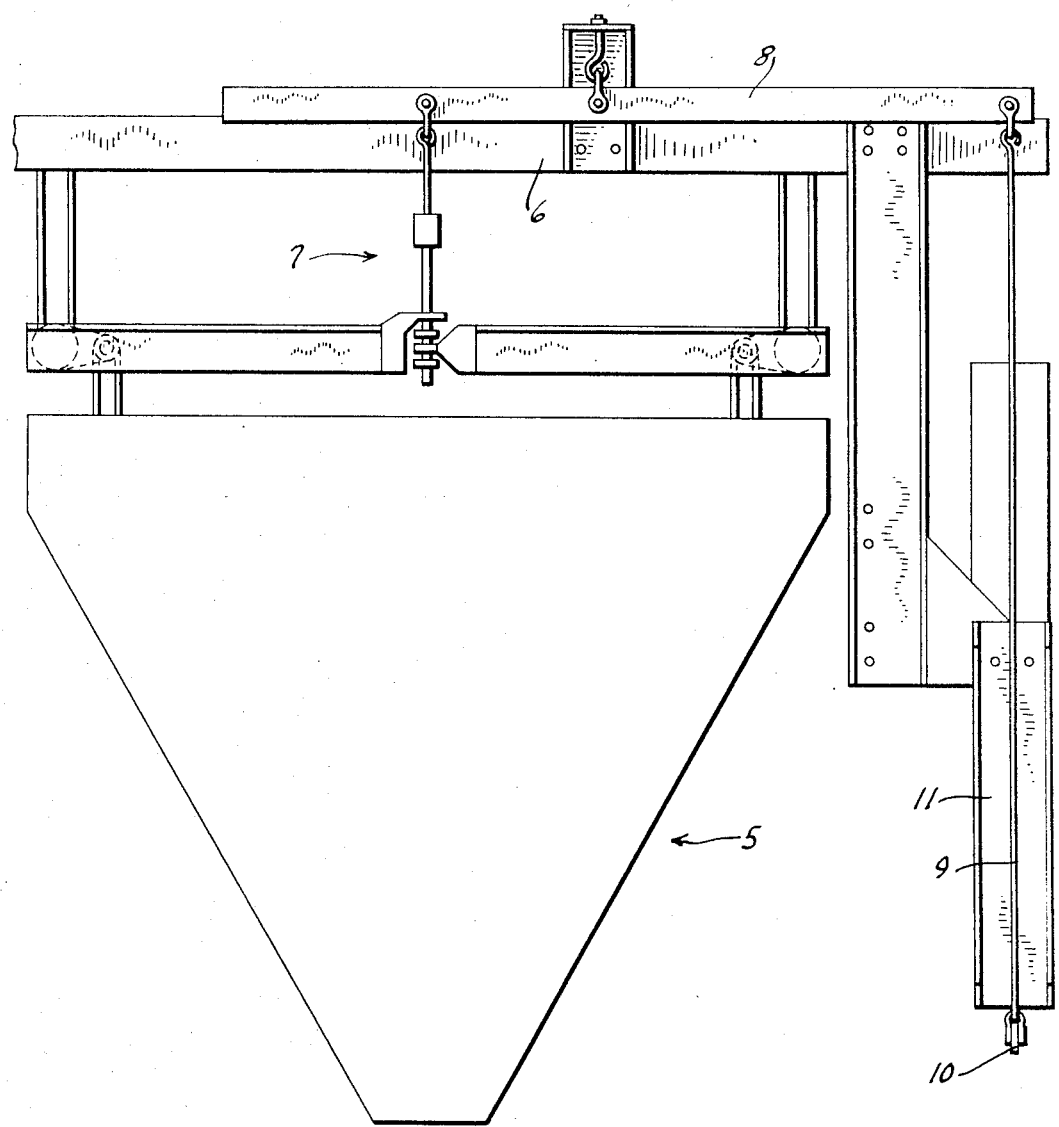

Jan. 24, 1967  W. A. MELENDY  3,299,977
DUAL RANGE WEIGHING SCALE
Filed April 7, 1965 5 Sheets-Sheet 5
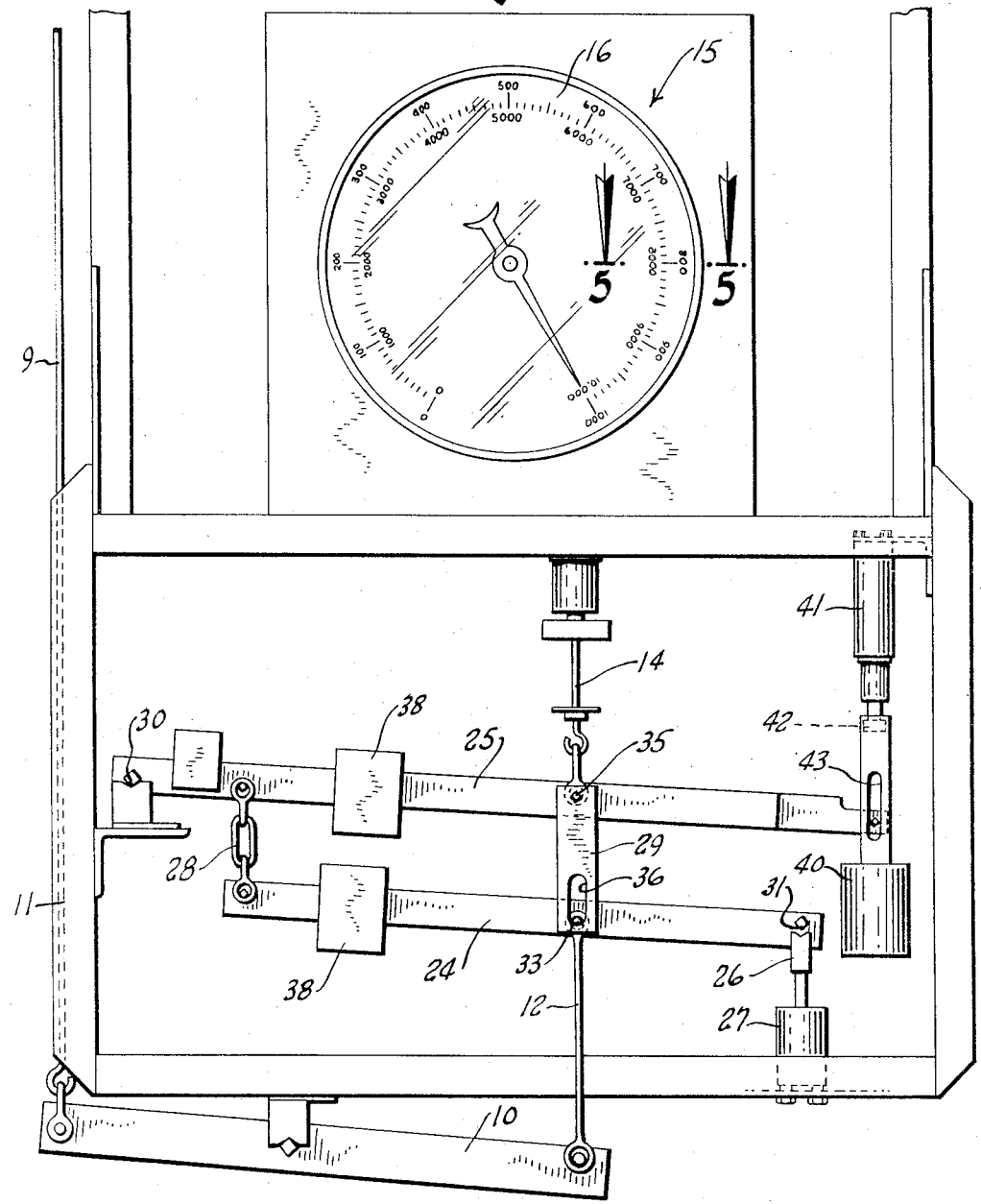
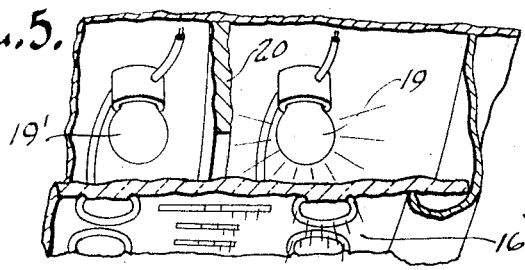
Inventor
Warren A. Melendy
By Ira Milton Jones
Attorney

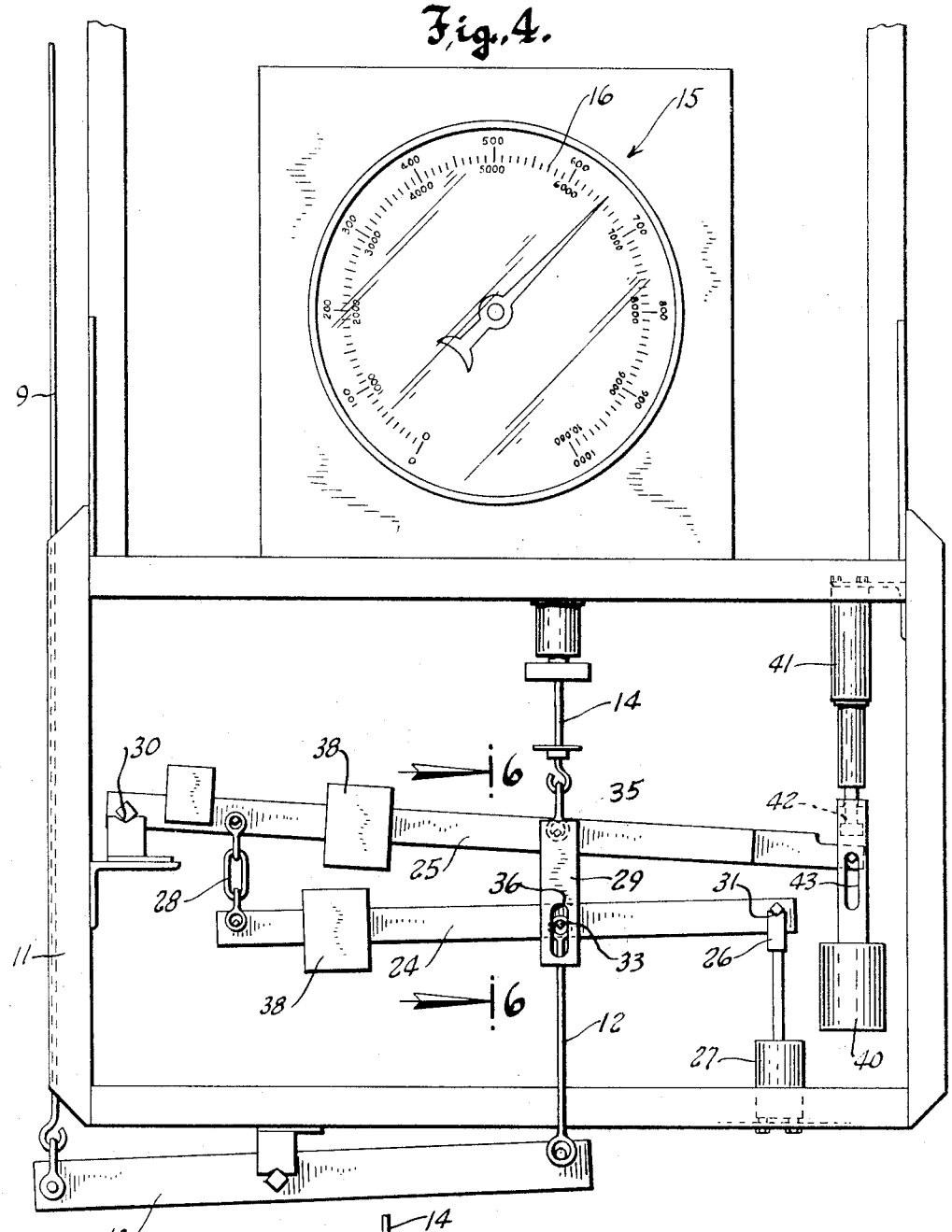
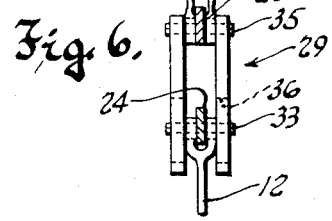

Jan. 24, 1967  W. A. MELENDY  3,299,977
DUAL RANGE WEIGHING SCALE
Filed April 7, 1965  5 Sheets-Sheet 5

Inventor.
Warren A. Melendy

United States Patent Office 3,299,977
Patented Jan. 24, 1967

3,299,977
DUAL RANGE WEIGHING SCALE
Warren A. Melendy, Waukesha, Wis., assignor to Butler Bin Company, Waukesha, Wis., a corporation of Wisconsin
Filed Apr. 7, 1965, Ser. No. 446,334
10 Claims. (Cl. 177—158)

This invention pertains to weighing scales, and especially to scales for weighing heavy bulk materials; and the invention relates more particularly to a scale capable of providing direct readings in each of two ranges of values.

Scales for weighing heavy bulk materials are usually of the beam type wherein the load is imposed, through a system of leverage, upon a dial indicator or similar read-out means calibrated in pounds or some other unit of weight, so that the dial provides direct readings when weights within a certain range are placed on the load receiving member of the scale. Heretofore when such a scale was to be used for weighing a load heavier than the largest amount for which the dial was calibrated, a so-called bottle weight was placed on the beam mechanism of the scale to provide a partial counterbalance for the load, and the reading taken from the dial then represented the difference between the full weight of the load and that portion of it that was offset by the bottle weight.

A specific example will demonstrate the problem posed by such prior scale arrangements. If the dial of a scale was calibrated in 100 pound units for a range of zero to 10,000 lbs., the weight of any load up to 10,000 lbs. could of course be read directly on the scale. But if it became necessary to weigh a load estimated at something over 10,000 lbs. but under 15,000 lbs., it was necessary to place on the beam mechanism a bottle weight calibrated for, say, 5,000 lbs., and then read the indication on the dial and add it to the value of the bottle weight to get the true weight of the load. In the example just given, a dial reading of 8,100 lbs. with a 5,000 lb. bottle weight would denote a true weight of 13,100 lbs.

Of course it was not always possible to estimate the weight of the load so closely that the proper bottle weight could be selected at the first try, and in that case a certain amount of experimentation with bottle weights was necessary before an accurate weighing could be obtained. A more serious disadvantage of this prior expedient was that the zero calibration on the dial no longer meant zero when a bottle weight was added but had to be read as equal to the value of the bottle weight. This created a number of opportunities for error, either through failing to add the bottle weight value to the reading given by the dial, through adding a wrong value for the bottle weight, or through incorrect addition.

By contrast, it is an object of the present invention to provide a dual-range scale in which the calibrations on the dial or other read-out indicator of the scale can be marked for each of two ranges of values and in which the zero calibration will signify zero for both ranges of values so as to permit direct readings to be taken in each range for which the scale is adapted, without the need for any allowance or calculation, thereby substantially eliminating chances for error and confusion.

More specifically, it is an object of this invention to provide a dual-range scale which is selectively adjustable to one or the other of two ranges of values by the mere movement of a control knob or the like, and which incorporates automatic signaling means for indicating which of its two value ranges the scale is set for.

Another specific object of this invention is to provide a dual-range scale which can be quickly and readily set to either of its value ranges and wherein an adjustment for tare weight is automatically effected by setting of a value range to insure that the zero calibration on the indicator of the scale will signify zero load in both value ranges.

A further specific object of this invention is to provide a dual-range scale of the character described having means providing for transmission of force from the load receiving member to the movable element of the read-out indicator selectively and alternatively through either of two motion transmission means that have different mechanical advantages, at least one of said motion transmission means comprising lever means having a fulcrum moveable to and from operative engagement therewith and selection of the motion transmission means that is to be operative being effected by movement of said fulcrum to or from operative engagement with the lever means.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed the invention may be made as come within the scope of the claims.

The accompanying drawings illustrate two complete examples of the physical embodiments of the invention constructed according to the best modes so far devised for the practical application of the principles thereof, and in which:

FIGURE 2 is a fragmentary side elevational view of a portion of the apparatus shown in FIGURE 1;

FIGURE 3 is a front elevational view on a larger scale showing the scale apparatus in the condition for its low value range of readings;

FIGURE 4 is a view similar to FIGURE 3 but illustrating the apparatus in the condition for its high value range of readings;

FIGURE 5 is a fragmentary view partly in perspective and partly in section on the plane of the line 5—5 in FIGURE 3;

FIGURE 6 is a sectional view taken on the plane of the line 6—6 in FIGURE 4.

Figure 1:
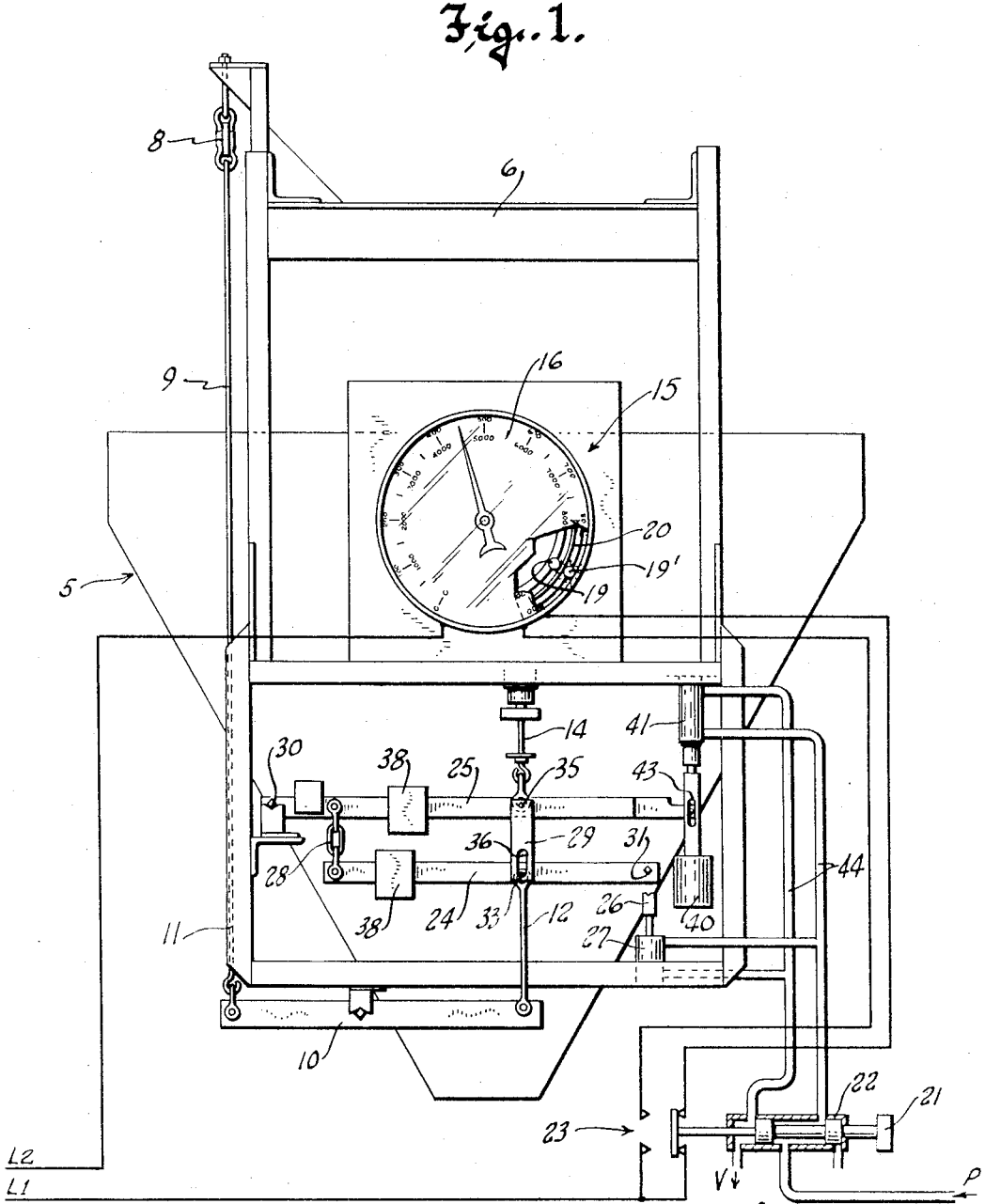
FIGURE 1 is a more or less diagrammatic front elevational view of a scale for weighing bulk materials that embodies the principles of this invention.

Referring now more particularly to the accompanying drawings, the numeral 5 designates a load receiving element which is mounted for limited up and down movement on a fixed frame 6 and which is adapted to hold loads to be weighed. In this instance the load receiving element is illustrated as a hopper that is adapted to hold heavy bulk materials such as cement, concrete aggregate, coal or ore, but it will be understood that the load receiving element might instead comprise a platform or the like.

Through a generally conventional suspension 7 (FIGURE 2) that connects the load receiving element with a medially fulcrumed beam 8, the loads imposed upon the load receiving element are carried to an upright tension rod 9 which is connected with the beam 8 and which in turn transfers the load forces to a medially fulcrumed shelf beam 10 that is located beneath a beam box 11.

The lower end of the tension rod 9 is pivotally connected to one end of the shelf beam, while a tension link 12, pivotally connected to the other end of the shelf beam, extends upwardly into the beam box to transmit forces through mechanism (described hereinafter) in the beam box to a plunger 14 that actuates the movable element of a read-out indicator 15. As will be understood by those skilled in the art, the forces imposed upon the tension link 12, and even upon the tension rod 9, are of a value which is only a small percentage of the weight of the load in the load receiving element 5, due to the leverage system through which forces are transmitted from the load receiving element to the tension link; but of course the tension force exerted by the link 12 is always in some fixed, predetermined ratio to the actual load.

Each of the calibration marks on the dial 16 signifies either of two values, depending upon the value range selected, except that the zero calibration signifies zero in both value ranges. Preferably two sets of indicia are provided to designate the two values assigned to each calibration, the indicia being delineated on a translucent dial face behind which there are two indicator lights 19 and 19' which are separated by a partition 20. Thus each indicator light can illuminate only one set of indicia, to show which set is to be read. The value assigned to each calibration in one of the two ranges is a predetermined multiple of the value assigned to the same calibration in the other range. For purposes of illustration the dial 16 is shown with low range indicia that designate weights of zero to 1,000 lbs. and with high range indicia denoting weights of zero to 10,000 lbs. In this instance the higher values are ten times the lower ones, but it will be evident that any other desired multiple could be used, and the calibrations would be assigned indicia accordingly.

The scale is set for one or the other of its ranges of values by means of a control knob or pushbutton actuator 21 that controls a two-position valve 22 and a double throw switch 23. In the position of the actuator 21 that is illustrated in FIGURE 1, the scale is set for its low value range and the switch 23 connects the low-value indicator light 19 with an electrical supply circuit $L_1$, $L_2$, to signify that the lower numbers on each calibration should be read. To set the scale for its high range of values it is only necessary to depress the pushbutton actuator (i.e., move it to the left in FIGURE 1), whereupon the high value indicator light 19' is energized and the light 19 goes out. Obviously, electromagnetically actuated movable shutters or the like could be substituted for the lights 19 and 19' to mask whichever set of indicia was not in use.

The mechanism in the beam box 11 which enables the scale to be selectively adapted for either of two value ranges comprises, in general, two lever elements 24 and 25 that can cooperate to function as a compound lever, a fulcrum element 26 that is vertically movable into and out of supporting engagement with the lever element 24, a tie link 28 that connects the two lever elements, and a ladder link 29 having certain connections (described hereinafter) with the lever elements, the tension link 12 and the plunger 14.

The two lever elements 24 and 25 extend generally parallel to one another and transversely to the tension link 12, and they are arranged to swing in a common vertical plane. The upper lever element 25 is permanently fulcrumed at one end about a fixed horizontal pivot 30, while the movable fulcrum element 26, when raised, is engageable with a knife edge horizontal pivot 31 on the end of the lower lever element that is remote from the fixed fulcrum 30. In the embodiment of the invention shown in FIGURES 1 to 6, inclusive, the fulcrum 26 is raised and lowered by means of a fluid pressure cylinder 27. When the movable piston of the fluid pressure cylinder 27 is in its retracted position (FIGURES 1 and 3) it disposes the movable fulcrum element 26 in its lowered inoperative position, spaced below the knife edge 31, and the scale mechanism is adapted for its low range of values. Depressing the control knob 21 causes the fluid pressure cylinder 27 to be activated and raise the movable fulcrum element 26 to its operative position (FIGURE 4) in which it supportingly engages the knife edge 31.

The tie link 28 serves to connect the two lever elements 24 and 25 in such a manner that they function as a compound third class lever when the movable fulcrum element 26 is in its operative position. The tie link 28 has a pivotal connection with the lower lever element 24 near the end thereof remote from its knife edge pivot 31, and has a pivotal connection with the upper lever element 25 that is spaced a relatively short distance therealong from the fixed fulcrum 30.

The ladder link 29 provides a lost motion connection between the tension link 12 and the plunger 14, which connection is effective to transmit motion of the tension link directly to the plunger when the movable fulcrum element 26 is in its inoperative position. The connection between the tension link 12 and the ladder link comprises a transverse pin 33 that has a close pivotal fit in the tension link and in the lower lever element 24, but which extends into a lengthwise elongated slot 36 in the ladder link. The connection between the ladder link 29 and plunger 14 comprises a transverse pivot pin 35 which extends through the ladder link, the plunger and the upper lever element 25 with a substantially close fit to constrain all three to motion in unison. The pivotal connections provided by the pins 33 and 35 have their axes on a substantially vertical line that extends transversely to the lever elements 24 and 25 and coincides with the axes of the tension link 12 and the plunger 14. It will be noted that the pin 33 and the bottom of the slot 36 in the ladder link constitute opposing separable abutments that are respectively connected with the lower lever element 24 and with the plunger 14.

When the movable fulcrum element 26 is in its retracted or lowered position (FIGURES 1 and 3) the lower lever element 24 can swing down about the tie link 28 to the point where the pin 33 engages in the bottom of the slot 36 in the ladder link, so that forces from the tension rod 12 are then transmitted directly through the ladder link to the plunger. Under these conditions the ladder link and tie link cooperate with the two lever elements 24 and 25 to provide a parallelogram linkage by which the lever elements are caused to swing in unison with up and down movement of the ladder link.

In its operative raised position, the movable fulcrum element 26 cooperates with the tie link 28 to so support the lower lever element as to maintain the connection pin 33 in the medial portion of the slot 36 in the ladder link, so that the ladder link and the lower lever element are free to move relative to one another; and hence up-and-down motion of the tension rod 12 is transmitted to the plunger 14 through the compound lever comprising the two lever elements 24 and 25, with the result that every movement of the tension rod produces a proportionally magnified corresponding movement of the plunger.

When the movable fulcrum 26 is in this raised operative position, the ratio between plunger movement and tension rod movement is of course determined by the leverages of the two lever elements 24 and 25. In this respect it will be noted that the tension link 12 is connected to the lower lever element 24 about midway between the tie link 28 and the fulcrum point provided by knife edge 31, and that the plunger 14 and ladder link 29 are connected to the upper lever element 25 at a point spaced therealong from the connection thereto of tie link 28 and at the side of the tie link remote from fixed fulcrum 30. Thus when the movable fulcrum member is in its operative raised position, each of the lever elements 24 and 25 individually functions as a third class lever, and the tie link serves to multiply their respective leverages. It will be understood that the effective lever arms of the two lever elements 24 and 25 are so selected that the ratio of plunger movement to tension rod movement is equal to the ratio between indicia in the high value range and corresponding indicia in the low value range.

The pressure fluid by which the cylinder 27 is actuated is preferably air, although oil or other fluid under pressure could also be used. The cylinder 27 is of the two-port double-acting type, and the valve 22 which controls flow of pressure fluid to that cylinder is of the two position type and serves to connect a selected one of the two cylinder ports with a source P of pressure fluid while simultaneously connecting the other port with a vent V.

When the apparatus is in its low value range condition illustrated in FIGURES 1 and 3, the lever elements 24 and 25 represent a certain amount of dead weight acting upon the plunger 14, and they function as a single beam pivoted about the fixed fulcrum 30. Hence by providing one or more counterweights 38 that are adjustably slideable along the lever elements, it is possible to provide an accurate adjustment for tare weight in the low range of values, by which the pointer will be brought exactly to zero when the load receiving element is empty. When the scale mechanism is in its condition for measuring the high range of values, however, there must be a compensation for the decreased effect of the weight of the load receiving element upon the plunger 14, and to this end there is provided a counterweight 40 which is movable to and from operative engagement with the free end of the upper lever element 25. In the embodiment of the invention shown in FIGURES 1–6, the counterweight 40 is actuated or lifted to its inoperative position and lowered to its operative position by means of a double acting pressure fluid cylinder 41 that is connected with the two-way valve 22 in parallel with the cylinder 27 that actuates the movable fulcrum element 26. The plunger or piston of the cylinder 41 has a lost motion connection 42 with the counterweight 40, so that when the counterweight is in its operative condition, it is supported from the upper lever element 25 and can move up and down relative to the actuator 41, to impose a load upon the upper lever element which provides tare compensation and insures that the pointer 17 will be at the zero calibration mark when the load receiving element is empty. There is likewise a lost motion connection 43 between the counterweight and the upper lever element which permits that lever element to swing freely up and down without interference from the counterweight when the counterweight is raised or lifted to its inoperative position.

The cylinders 27 and 41 are so connected with the two-way valve 22 by means of ducts 44 that the pistons or plungers of the two cylinders are retracted simultaneously when the valve is moved to its low value range position illustrated in FIGURE 1 and are projected simultaneously when the valve is moved to its high value range position.

Figure 7:
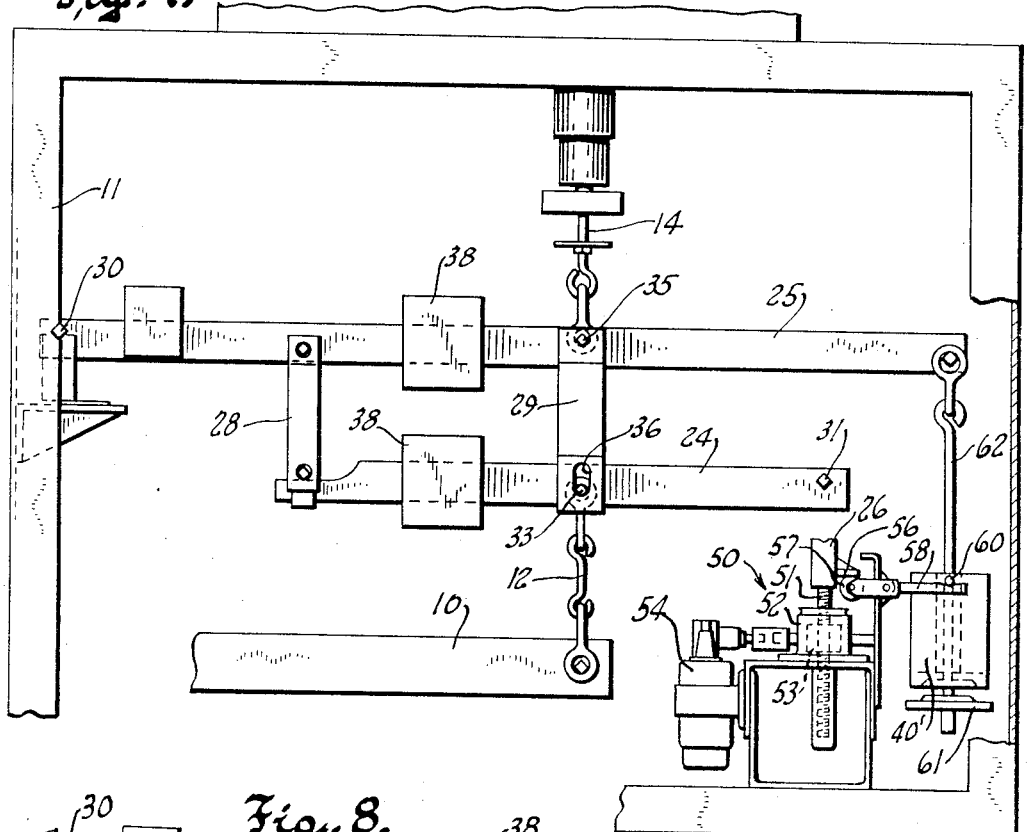
FIGURES 7 and 8 are front elevational views similar to FIGURE 3, but illustrating a modified embodiment of the invention.
Figure 8:
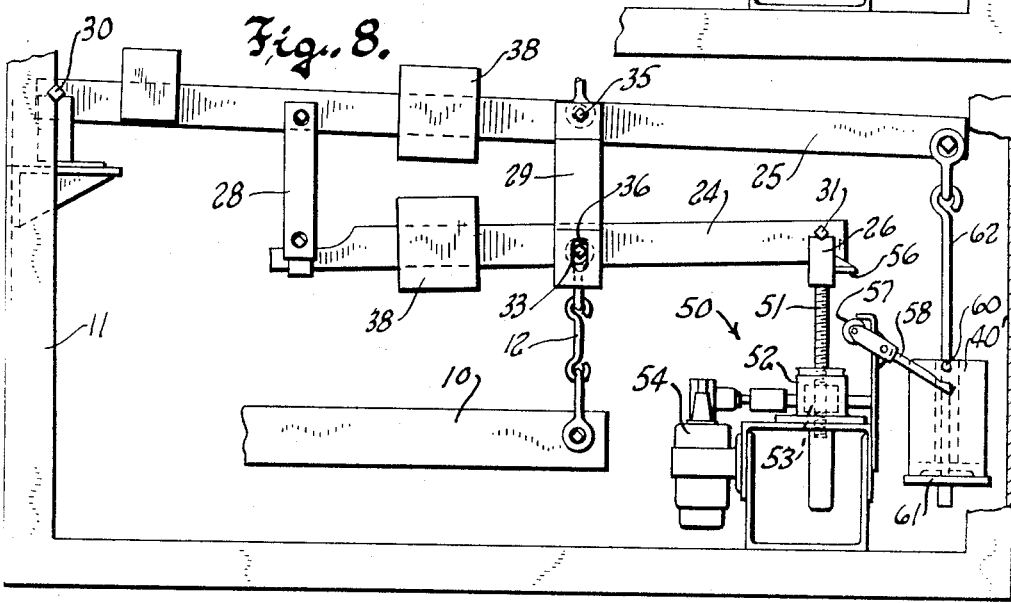

In the modified embodiment of the invention illustrated in FIGURES 7 and 8, a mechanical lifting mechanism indicated generally by the numeral 50 takes the place of the cylinders 27 and 41 to control the position of the fulcrum 26 and the operativeness of the counterweight 40'.

This lifting mechanism 50 comprises a lead screw 51 to which the fulcrum 26 is fixed, and which is slideably though non-rotatably mounted in a bearing or housing structure 52. The bearing or housing structure 52 is suitably secured in the beam box 11 and contains a captive nut 53 which is threaded on the lead screw 51. A drive motor 54 drivingly connected with the nut 53 provides means for turning the nut in one direction or the other to effect axial up or down motion of the lead screw, depending upon the direction in which the motor 54 turns. Any suitable control means (not shown) may be provided to start and stop the motor and determine its direction of rotation.

Obviously, by driving the motor 54 in the direction to raise the lead screw 51, the fulcrum 26 will be brought to its operative position supportingly engaging the knife-edged pivot 31; and when the motor operates in the opposite direction to lower the lead screw, the fulcrum 26 will be retracted to its lowered inoperative position.

Concomitantly with the lowering of the lead screw, the effect of the counterweight 40' upon the leverage system will be nullified. This is done by an abutment 56 on the fulcrum 26 colliding with a roller 57 on one end of a medially pivoted lever 58. The opposite end of the lever 58 is in the form of a yoke and embraces the counterweight 40' with the arms thereof engageable with a pair of oppositely projecting pins 60 on the sides of the counterweight 40'. Hence, when the lever arm is swung in its counterclockwise direction by the lowering of the lead screw 51, the counterweight 40' will be lifted off of a collar 61 fixed to a link 62 which is suspended from the adjacent end of the upper lever 25, whereupon the leverage system will be freed of the effect of the counterweight.

From the foregoing description taken together with the accompanying drawings, it will be apparent that this invention provides a dual range scale having calibrations which can be marked for direct reading of two sets of values, every calibration having a value in one range of values which is a predetermined multiple of its value in the other range, and with the zero value of the two ranges coinciding. It will also be apparent that the scale of this invention is very quickly and easily adjustable to set it for one or the other of its two ranges of values, and that there is almost no possibility of confusion or error because all readings are given directly without need for any arithmetical correction.

What is claimed as my invention is:

1. In a weighting scale having a force transmitting member connected with a movable load receiving element to partake of motion of the latter in response to variations in load thereon, and an indicator having a stationary element and a cooperating movable element adapted to respond to motion of the force transmitting member, one of said elements of the indicator being calibrated in terms of weights for indicating the values of loads on the load receiving element:

(A) first motion transmitting means providing a connection between the force transmitting member and the movable element of the indicator having one predetermined mechanical advantage, so that calibrations on the indicator are correctly readable in terms of one set of values, said first motion transmitting means comprising (1) lever means having a predetermined fulcrum point, (2) means providing a first pivotal connection between the force transmitting member and said lever means at a first connection point spaced along the length of the lever means from said fulcrum point, and (3) means providing a second pivotal connection between the movable element of the indicator means and the lever means at a point spaced along the length of the lever means from the fulcrum point and from the first connection point;

(B) second motion transmitting means providing a connection between the force transmitting member and the movable element of the indicator that has a different predetermined mechanical advantage so that calibrations on the indicator are correctly readable in terms of a second set of values that are a predetermined multiple of the values of the first set; and (C) means for selectively and alternatively rendering one or the other of said motion transmitting means operative, said last named means comprising (1) fulcrum means, and (2) means mounting said fulcrum means for movement between an operative position of engagement with the lever means at the fulcrum point, to render operative the first motion transmitting means, and an inoperative position, disengaged from the lever means, to render operative the second motion transmitting means.

2. The weighing scale of claim 1 wherein said second motion transmitting means comprises:
   (A) means connected with the force transmitting member defining a first abutment;
   (B) means connected with the movable element of the indicator defining a second abutment which opposes the first abutment and is engageable therewith to provide a motion transmitting connection between the force transmitting member and the movable element of the indicator; and
   (C) means responsive to movement of the fulcrum means to its operative position for disengaging said abutments.

3. The weighing scale of claim 2 wherein:
   (A) the first abutment faces upwardly;
   (B) the second abutment faces downwardly;
   (C) said means which provides the second abutment is also connected with the lever means and is thereby constrained to move with the same; and
   (D) said means mounting the fulcrum means for movement between its operative and inoperative positions affords sufficient travel of the fulcrum means so that the same in moving to its operative position lifts the portion of the lever means to which the second abutment defining means is connected to thereby separate said abutments to an extent which prevents motion transmitting engagement between them.

4. The weighing scale of claim 1, further characterized by the following:
   (A) said lever means being a compound lever comprising a pair of generally parallel lever elements disposed one above the other and having said fulcrum point near one end of the lower one of said lever elements, said first pivotal connection being with the lower lever element, and said second pivotal connection being with the upper lever element;
   (B) a second fulcrum engaged with the upper lever element at a second fulcrum point near the end thereof remote from said first mentioned fulcrum point;
   (C) link means providing a motion transmitting connection between said lever elements at points spaced from their respective fulcrum points; and
   (D) said second motion transmitting means comprising a ladder link having a fixed motion transmitting connection with one of said lever elements and having a lost motion connection with the other of said lever elements such that the ladder link is inoperative to transmit motion of the force transmitting member to said movable element of the indicator when the first mentioned fulcrum means is in its operative position but is rendered operative to constrain the lever elements to swing in unison about the second fulcrum by movement of said first mentioned fulcrum means to its inoperative position.

5. The weighing scale of claim 4, further characterized by: a counterweight movable to and from an operative position of engagement with one of said lever elements at a predetermined location thereon spaced from its fulcrum, said counterweight, when in its operative position, being adapted to compensate for tare of the load receiving element when said first designated fulcrum means is in its operative position.

6. The weighing scale of claim 5 further characterized by the following:
   (A) actuating means for moving the counterweight to and from its operative position, said actuating means having a lost motion connection with the counterweight whereby the counterweight is free to move with said one lever element without interference from the actuating means;
   (B) a control element for said actuating means movable between a pair of defined positions, one corresponding to each of the sets of values applicable to the calibrations; and
   (C) said means mounting the first designated fulcrum means for movement to and from its operative position comprises an actuator connected with said control element to be controlled thereby.

7. The weighing scale of claim 6 further characterized by:
   (A) electric means for designating the set of values that is applicable to the calibrations; and
   (B) switch means under the control of said control element and connected with said electric means.

8. In a weighing scale having a load receiving element and having an indicator comprising cooperating fixed and movable members, one of which has calibrations for indicating the values of loads on the load receiving element, means for alternatively and selectively rendering the scale capable of measuring loads in either of two ranges, in one of which every calibration signifies a predetermined multiple of its value in the other range, said last named means comprising:
   (A) a pair of generally parallel elongated lever elements;
   (B) fixed fulcrum means engaging one of said lever elements near one end thereof;
   (C) means providing a second fulcrum that is movable toward and from an operative position engaged with said other lever element near the end thereof that is remote from the the fixed fulcrum, said second fulcrum, when in its operative position, providing for measurements in the higher of said ranges of values;
   (D) tie means connecting said lever elements at points that are spaced along their lengths from the points at which they are engaged by said fulcrum;
   (E) means providing a first pivotal force transmitting connection between the load receiving element and one of said lever elements, spaced along the latter from its fulcrum point and from the connection thereto of said tie means;
   (F) means providing a second pivotal force transmitting connection between the movable member of the indicator and the other of said lever elements, spaced along the latter from its fulcrum point and from the connection thereto of said tie means, said second pivotal connection being on a line transverse to the lever elements and through said first pivotal connection; and
   (G) link means providing a lost motion connection between said first and second pivotal connections whereby they are free to move relative to one another when the second fulcrum is in its operative position, so that force is transmitted from the load receiving element to the movable member of the indicator through said lever elements, said lost motion connection being engaged by swinging of said other lever element about its connection with the tie means when the second fulcrum is moved out of its operative position, so that force is then transmitted through said link means from the load receiving element to the movable member.

9. In a weighing scale having a load receiving element and having an indicator comprising cooperating fixed and movable members, one of which has calibrations for indicating the values of loads on the load receiving element, means for alternatively and selectively rendering the scale capable of measuring loads in either of two ranges, in one of which every calibration signifies a predetermined multiple of its value in the other range, said last named means comprising:
   (A) a compound lever comprising a pair of lever elements extending generally parallel to one another and each having a fulcrum point near one end thereof remote from the fulcrum point on the other lever element;

(B) means providing a first pivotal connection between the force transmitting member and one of said lever elements at a point along the latter that is spaced from its fulcrum point;

(C) means providing a second pivotal connection between the movable element of the indicator and the other of said lever elements at a point along the latter that is spaced from its fulcrum point, said second pivotal connection being on a line through the first pivotal connection that extends generally transversely to the two lever elements;

(D) a fixed fulcrum member engaging one of said lever elements at its fulcrum point;

(E) a second fulcrum member movable between an operative position engaged with the other lever element at its fulcrum point and an inoperative position spaced from said other lever element;

(F) means providing a first motion transmitting connection between the force transmitting member and the movable element of the indicator, operative when the second fulcrum member is in its operative position, for causing said movable element to move at one ratio to movement of the force transmitting member, said first motion transmitting connection means comprising a tie link connecting said lever elements, the connection of the tie link to each lever element being at a point on the lever element that is spaced along the same from its fulcrum point and from said line through the pivotal connections; and (G) means providing a second motion transmitting connection between the force transmitting member and the movable element of the indicator, operative when the second fulcrum member is in its inoperative position, for causing said movable member to move at a different ratio to movement of the force transmitting member, said second motion transmitting connection means comprising a ladder link connecting said first and second pivotal connection means.

10. The weighing scale of claim 9, further characterized by the following:

(A) the fixed fulcrum member engages the lever element that has said second pivotal connection with the movable element of the indicator, and the second fulcrum member is engageable with the lever element that has said first pivotal connection with the force transmitting member; and (B) the ladder link has a lost motion connection with said first pivotal connection whereby the ladder link is rendered operative to transmit motion directly from the force transmitting member to the movable element of the indicator by movement of the second fulcrum member to its inoperative position and is rendered inoperative to transmit such motion by movement of the second fulcrum member to its operative position.

References Cited by the Examiner
UNITED STATES PATENTS
2,467,300  4/1949  Fate _____ 177—158
FOREIGN PATENTS
1,364,947  5/1964  France.

RICHARD B. WILKINSON, *Primary Examiner.*

G. H. MILLER, *Assistant Examiner.*